(12) United States Patent
van de Ven et al.

(10) Patent No.: US 8,885,565 B2
(45) Date of Patent: Nov. 11, 2014

(54) MIXED OFF-SITE/ON-SITE PREDICTION COMPUTATION FOR REDUCING WIRELESS RECONNECTION TIME OF A COMPUTING DEVICE

(71) Applicants: Adriaan van de Ven, Portland, OR (US); James T. Kukunas, Hillsboro, OR (US); Dirk Hohndel, Portland, OR (US)

(72) Inventors: Adriaan van de Ven, Portland, OR (US); James T. Kukunas, Hillsboro, OR (US); Dirk Hohndel, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 86 days.

(21) Appl. No.: 13/631,439

(22) Filed: Sep. 28, 2012

(65) Prior Publication Data

US 2014/0092805 A1 Apr. 3, 2014

(51) Int. Cl.
*H04W 4/00* (2009.01)
*H04W 76/02* (2009.01)

(52) U.S. Cl.
CPC ...................................... *H04W 76/02* (2013.01)
USPC ......................................................... 370/328

(58) Field of Classification Search
USPC ......... 370/328–339; 455/412.1, 432.1, 432.3, 455/453
See application file for complete search history.

(56) References Cited

U.S. PATENT DOCUMENTS

| | | |
|---|---|---|
| 2008/0182568 A1 | 7/2008 | Kim |
| 2008/0186882 A1* | 8/2008 | Scherzer et al. ............... 370/310 |
| 2009/0042557 A1* | 2/2009 | Vardi et al. ................. 455/422.1 |
| 2009/0305679 A1 | 12/2009 | Kim |
| 2010/0303051 A1 | 12/2010 | Umeuchi et al. |
| 2011/0106930 A1 | 5/2011 | Lee et al. |
| 2012/0163260 A1 | 6/2012 | Yeo |
| 2012/0178488 A1* | 7/2012 | Jonker et al. ................... 455/517 |
| 2014/0092755 A1 | 4/2014 | van de Ven et al. |

FOREIGN PATENT DOCUMENTS

| | | |
|---|---|---|
| KR | 1020110047772 A | 5/2011 |
| KR | 1020120012908 A | 2/2012 |
| KR | 1020120070707 A | 7/2012 |
| KR | 1020120106292 A | 9/2012 |
| WO | 2006066181 A1 | 6/2006 |
| WO | 2009134587 A2 | 11/2009 |
| WO | 2014052758 A1 | 4/2014 |
| WO | 2014052767 A1 | 4/2014 |
| WO | 2014052839 A1 | 4/2014 |

OTHER PUBLICATIONS

Poli et al., "A Field Guide to Genetic Programming," 2008, published via http://lulu.com and freely available at http://www.gp-field-guide.org.uk, 250 pages.

(Continued)

*Primary Examiner* — Frank Duong
(74) *Attorney, Agent, or Firm* — Barnes & Thornburg, LLP

(57) ABSTRACT

A method, system, and device for reducing connection time to a wireless access point includes recording wireless connection information in a log, remotely computing parameters as a function of past wireless connection information in the log, generating an ordered list of wireless access points most likely to be available for reconnection at a desired time as a function of recent wireless connection information in the log, and directly probing a wireless access point instead of initiating a wireless access point scan. In some embodiments, remotely computing parameters as a function of past wireless connection information in the log comprises performing genetic programming operations to generate prediction programs for later prediction of wireless access points most likely to be available for reconnection at a desired time.

25 Claims, 8 Drawing Sheets

(56) References Cited

OTHER PUBLICATIONS

Van De Ven et al., "Reducing Wireless Reconnection Time of a Computing Device," U.S. Appl. No. 13/631,430, Sep. 28, 2012, 43 pages.

International Search Report and Written Opinion received for PCT Application No. PCT/US2013/062320, mailed on Jan. 2, 2014, 9 pages.

International Search Report and Written Opinion received for Patent Application No. PCT/US2013/062202, mailed on Jan. 24, 2014, 9 pages.

International Search Report and Written Opinion received for International Patent Application No. PCT/US2013/062320, mailed on Jan. 29, 2014, 10 pages.

International Search Report and Written Opinion received for International Patent Application No. PCT/US2013/062188, mailed on Jan. 2, 2014, 9 pages.

Han et al., "Directional Handoff using Geomagnetic Sensor in Indoor WLANs," 2012 IEEE International Conference on Pervasive Computing and Communications (PerCom), Mar. 19-23, 2012, 7 pages.

Park et al., "Step-wise Active Scanning in TGai," Presentation, IEEE Document: IEEE 802.11-12/0257r1, Mar. 3, 2012, 10 pages.

Nicholson et al., "Improved Access Point Selection," Proceedings of the 4th international conference on Mobile systems (MobiSys '06), applications and services, Jun. 19-22, 2006, pp. 233-245.

\* cited by examiner

MIXED OFF-SITE/ON-SITE PREDICTION COMPUTATION FOR REDUCING WIRELESS RECONNECTION TIME OF A COMPUTING DEVICE

BACKGROUND

Modern computing devices, such as laptops, smartphones, mobile internet devices (MIDs), and tablets, often include functionality for wirelessly connecting with one or more networks. Such functionality is increasingly important to users of computing devices that often travel between any number of different locations, but still require access to network-based content and services provided by a remote computing device or server. In providing such access, a computing device may wirelessly connect with one or more different wireless access points, each of which are connected to a network, such as the Internet.

To decrease the amount of time required to reconnect to a particular wireless access point, a computing device may save a password and an identifier associated with each wireless access point to which the computing device connects. As such, when scanning for available wireless access points with which to connect, the computing device may receive an identifier that matches one of the saved identifiers. In response, the computing device may reconnect to the wireless access point associated with the received identifier using the corresponding password and thereby decrease the amount of time needed to connect. However, saving an identifier and a password for each wireless access point to which the computing device connects does not typically decrease the amount of time needed to scan for available wireless access points with which to connect.

Additionally, some computing devices may attempt to reconnect to one or more wireless access points based on a current location. For example, some computing devices may determine a current location and attempt to reconnect to one or more wireless access points known to be available for reconnection at the determined location. To do so, however, such computing devices must typically include location-determining functionality (e.g., Global Positioning System components, radio frequency triangulation, network connectivity, etc.), which may either be computationally and resource intensive on the computing device or require an always-on/always-available connection to a network.

BRIEF DESCRIPTION

The concepts described in the present disclosure are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

Figure 1:
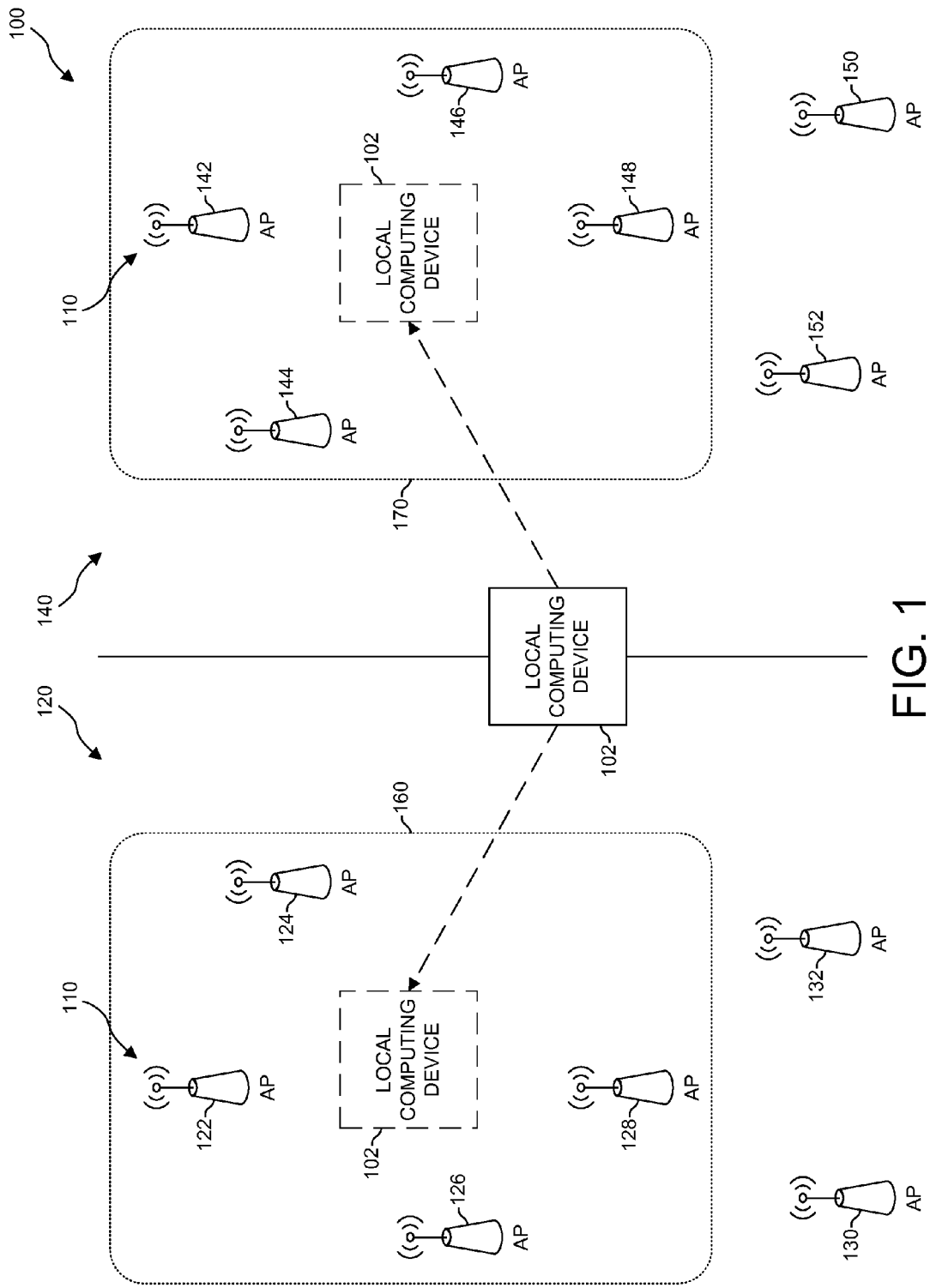
FIG. 1 is a simplified block diagram of at least one embodiment of a system for predicting an available wireless access point to reduce wireless reconnection time of a local computing device.
Figure 2:
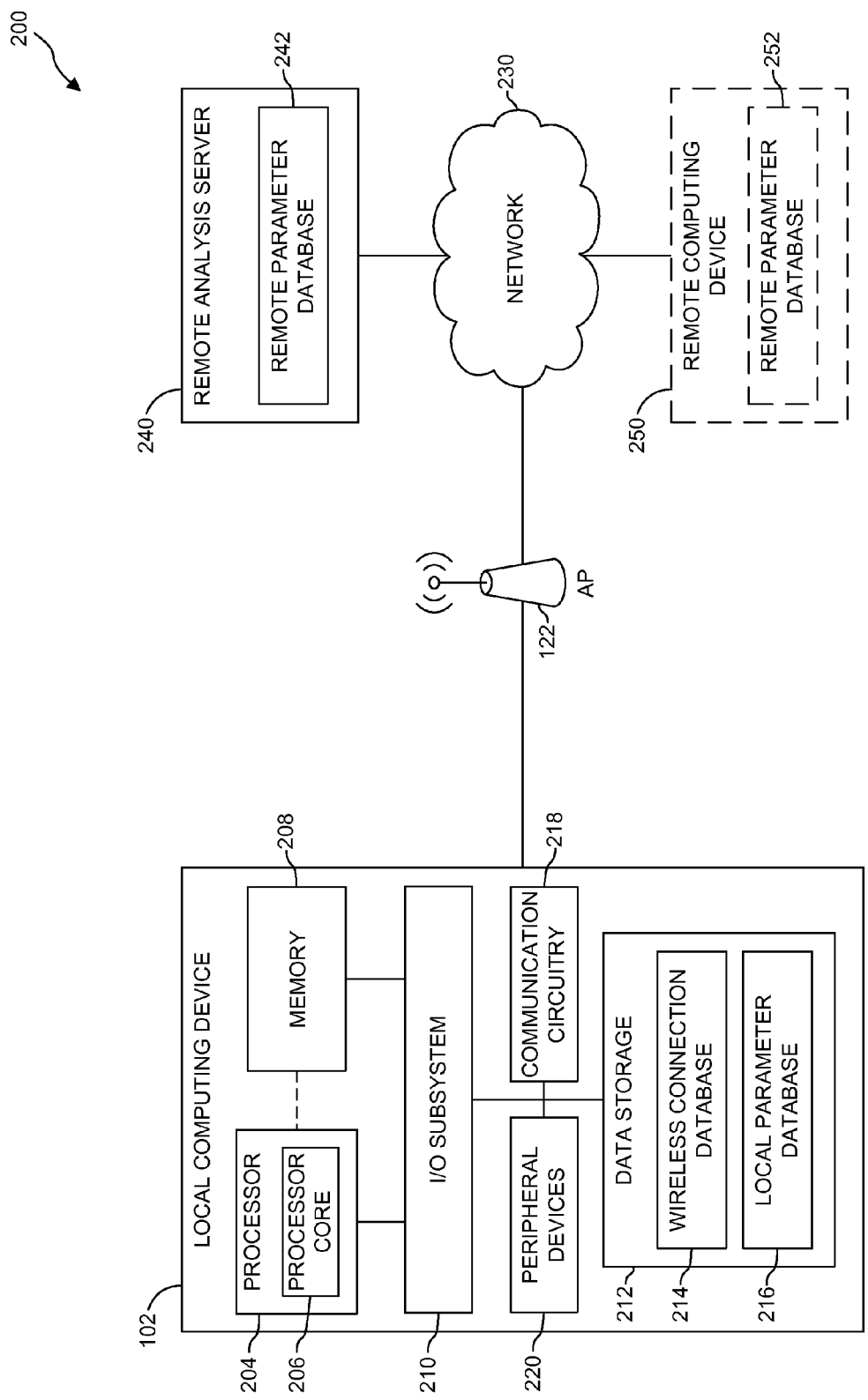
FIG. 2 is a simplified block diagram of at least one embodiment of a system for wirelessly reconnecting to a wireless access point using the local computing device of FIG. 1 and a remote analysis server.
Figure 4:
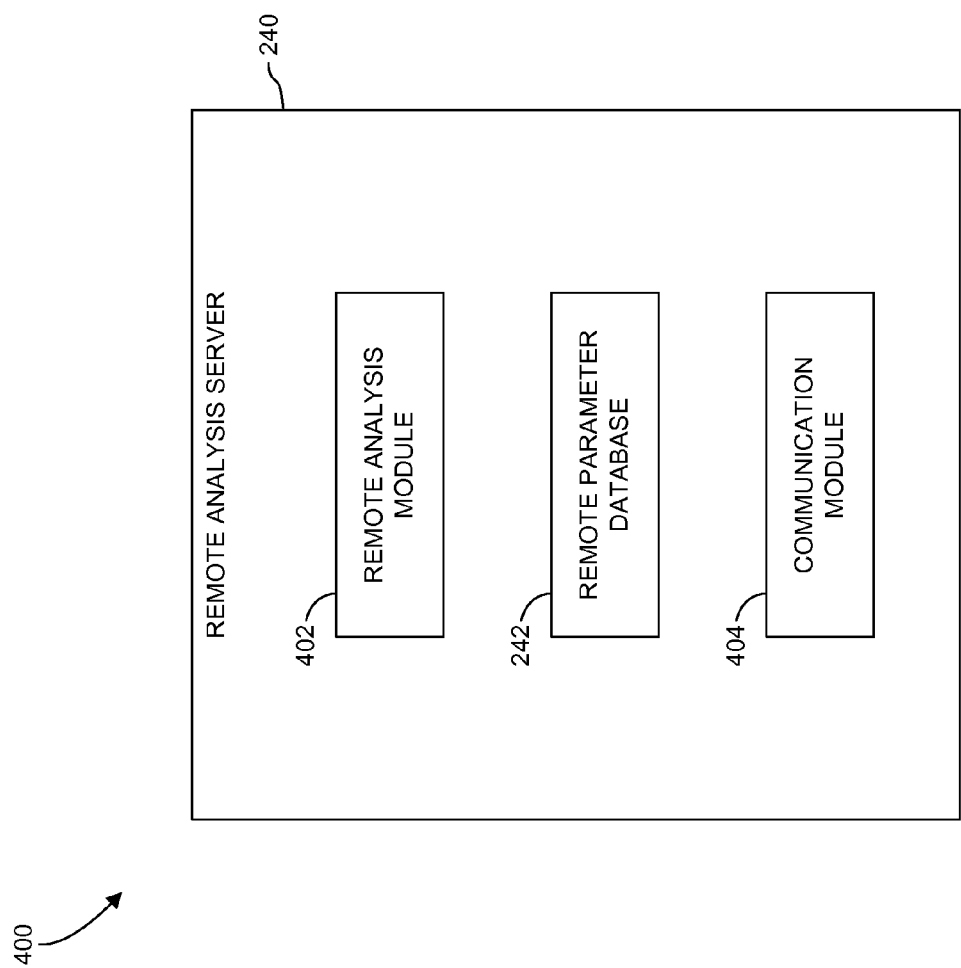
FIG. 4 is a simplified block diagram of at least one embodiment of an environment of the remote analysis server of FIG. 2.
Figure 7:
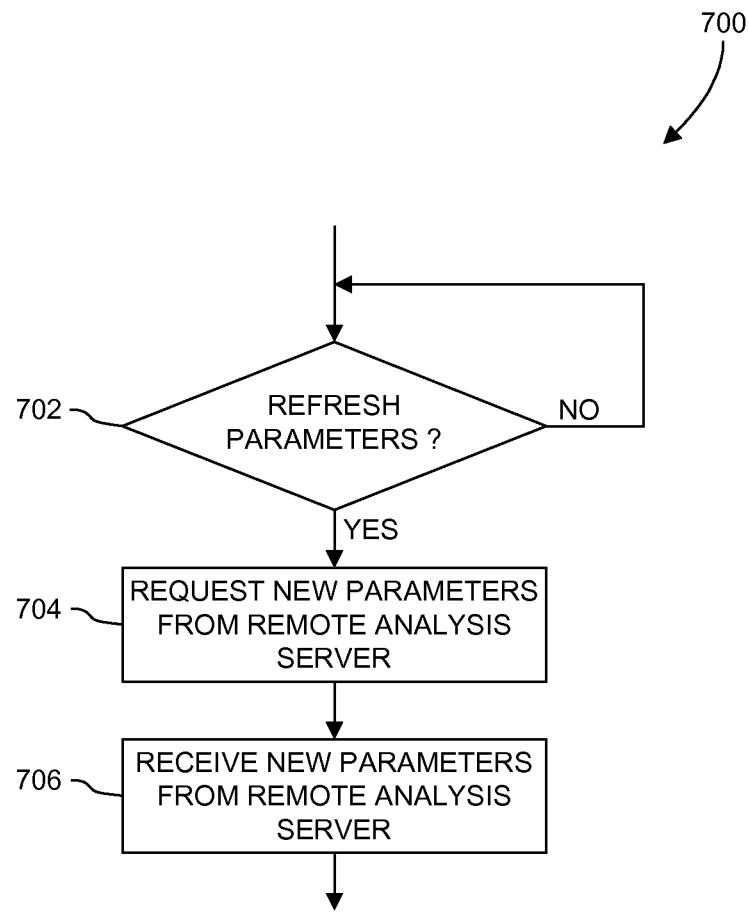
Figure 8:
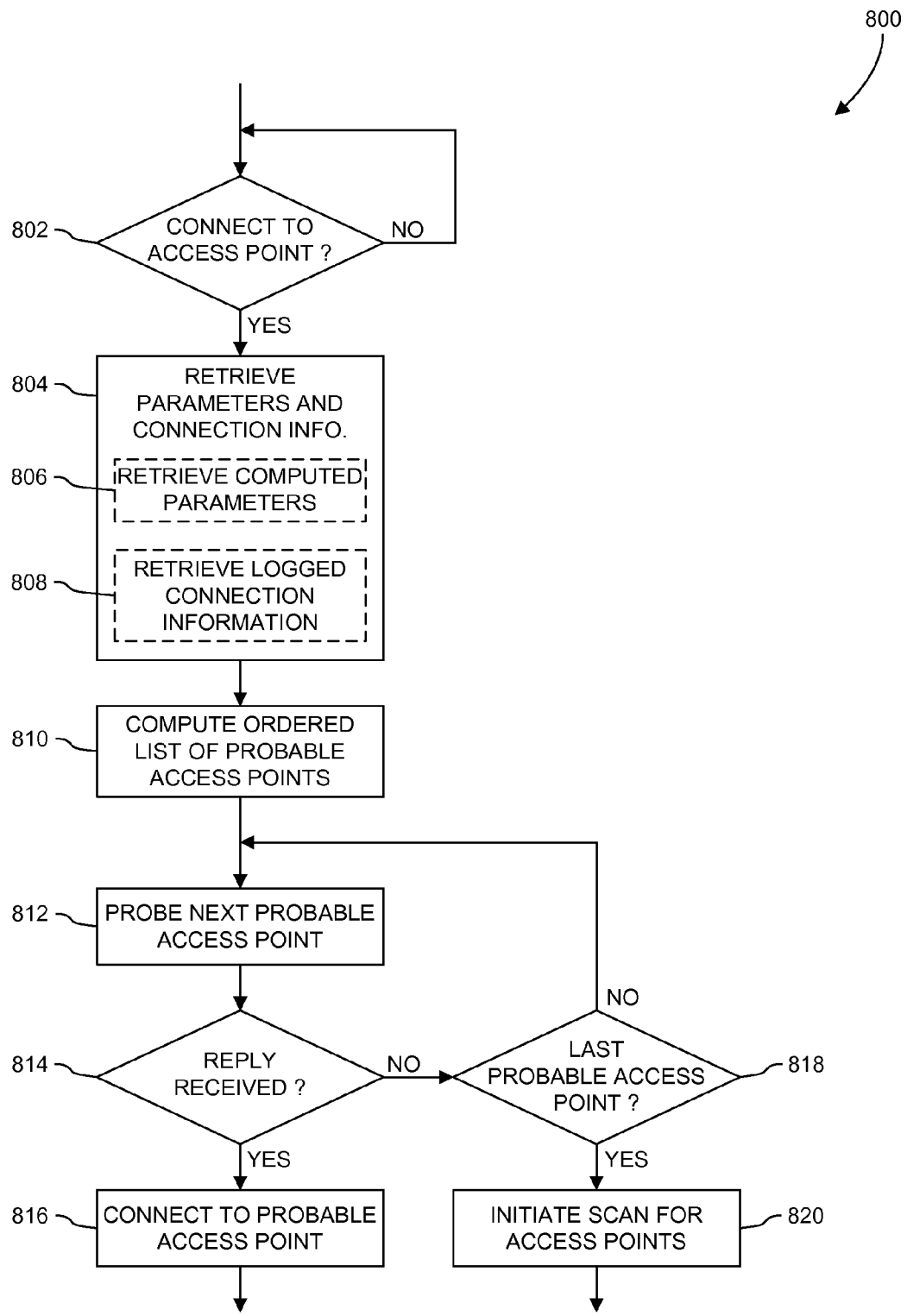

FIG. 7 is a simplified flow diagram of at least one embodiment of a method for requesting new parameters from the remote analysis server of FIGS. 2 and 4 using the local computing device of FIGS. 1 and 2; and FIG. 8 is a simplified flow diagram of at least one embodiment of a method for using parameters received from the remote analysis server of FIGS. 2 and 4 to predict an available wireless access point for reconnection with the local computing device of FIGS. 1 and 2.

DETAILED DESCRIPTION

While the concepts of the present disclosure are susceptible to various modifications and alternative forms, specific embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present disclosure. It will be appreciated by one skilled in the art, however, that embodiments of the disclosure may be practiced without such specific details. In other instances, control structures, gate level circuits and full software instruction sequences have not been shown in detail in order not to obscure the description of the of the concepts described herein. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the concepts described herein may be implemented in hardware, firmware, software, or any combination thereof. Embodiments implemented in a computer system may include one or more point-to-point or bus-based interconnects between components. Embodiments of the concepts described herein may also be implemented as instructions carried by or stored on one or more machine-readable or computer-readable storage media, which may be read and executed by one or more processors. A machine-readable or computer-readable storage medium may be embodied as any device, mechanism, or physical structure for storing or transmitting information in a form readable by a machine (e.g., a computing device). For example, a machine-readable or computer-readable storage medium may be embodied as read only memory (ROM) device(s); random access memory (RAM) device(s); magnetic disk storage media; optical storage media; flash memory devices; mini- or micro-SD cards, memory sticks, and others.

In the drawings, specific arrangements or orderings of schematic elements, such as those representing devices, modules, instruction blocks and data elements, may be shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

In general, schematic elements used to represent instruction blocks may be implemented using any suitable form of machine-readable instruction, such as software or firmware applications, programs, functions, modules, routines, processes, procedures, plug-ins, applets, widgets, code fragments and/or others, and that each such instruction may be implemented using any suitable programming language, library, application programming interface (API), and/or other software development tools. For example, some embodiments may be implemented using Java, C++, and/or other programming languages. Similarly, schematic elements used to represent data or information may be implemented using any suitable electronic arrangement or structure, such as a register, data store, table, record, array, index, hash, map, tree, list, graph, file (of any file type), folder, directory, database, and/or others.

Further, in the drawings, where connecting elements, such as solid or dashed lines or arrows, are used to illustrate a connection, relationship or association between or among two or more other schematic elements, the absence of any such connecting elements is not meant to imply that no connection, relationship or association can exist. In other words, some connections, relationships or associations between elements may not be shown in the drawings so as not to obscure the disclosure. In addition, for ease of illustration, a single connecting element may be used to represent multiple connections, relationships or associations between elements. For example, where a connecting element represents a communication of signals, data or instructions, it should be understood by those skilled in the art that such element may represent one or multiple signal paths (e.g., a bus), as may be needed, to effect the communication.

Referring now to FIG. 1, a system 100 for reducing an amount of time required to re-establish a wireless connection comprises a local computing device 102 and one or more wireless access points 110. The local computing device 102 may attempt to re-establish a wireless connection with one or more of the wireless access points 110 as a function of historical connection information and a current context of the local computing device 102. Additionally or alternatively, the local computing device 102 may predict a group 160, 170 of the wireless access points 110 most likely (e.g., most probable) to be in range of the local computing device 102 at a given time.

In some embodiments, the predictions may be determined as a function of the current context of the local computing device 102 and historical connection information analyzed using one or more artificial intelligence-based techniques (e.g., genetic algorithms, genetic programming, etc.). In such embodiments, analyzing historical connection information using one or more artificial intelligence-based techniques may be computationally and/or resource intensive on the local computing device 102. This is especially true in embodiments wherein the local computing device 102 comprises a mobile computing device (e.g., a smartphone, tablet computer, e-reader, laptop computer, personal digital assistant, etc.) or any other type of computing device capable of fully or partially operating using a limited or reduced power source (e.g., a battery, hand-power crank, photovoltaic cell, etc.). As a result, the local computing device 102 may off-load all or a portion of the historical connection information analysis to one or more remote computing devices. To do so, the local computing device 102 may transmit historical connection information to the one or more remote computing devices, which may then analyze the received historical connection information using the one or more artificial intelligence-based techniques. As a function of that analysis, the one or more remote computing devices may compute one or more parameters, which as discussed in more detail below, may later be used to facilitate predicting which of the one or more wireless access points 110, or the group 160, 170 of the one or more wireless access points 110, is most likely (e.g., most probable) to be in range of the local computing device 102 at a given time.

At certain intervals, which may correspond to a reference interval in some embodiments, the local computing device 102 may request that new and/or updated parameters be sent from the one or more remote computing devices. In some embodiments, the local computing device 102 may request the new and/or updated parameters in response to the occurrence of one or more events or trigger conditions. For example, the local computing device 102 may request new and/or updated parameters from the one or more remote computing devices in response to determining that a loss of network connectivity or a shutdown is imminent. By proactively refreshing locally stored parameters, the local computing device 102 may ensure that more recent parameters are used to facilitate predicting which of the one or more wireless access points 110, or the group 160, 170 of the one or more wireless access points 110, is most likely (e.g., most probable) to be in range of the local computing device 102 at a given time.

The local computing device 102 may subsequently determine the likelihood (e.g., the probability) that each of the wireless access points 110 will be available for reconnection (e.g., accessible, in range of the local computing device 102, etc.) at the given time as a function of the current context of the local computing device 102 and the previously computed parameters received from the one or more remote computing devices. As a function of that determination, the local computing device 102 may generate an ordered list comprising a reference number of the wireless access points 110 having the highest probabilities of being available for reconnection (e.g., the top four wireless access points 110). That is, the local computing device 102 may generate an ordered list of the wireless access points 110 arranged in a descending manner according to the probability determined for each.

In some embodiments, the local computing device 102 may predict different groups 160, 170 and generate corresponding ordered lists of the wireless access points 110 as a function of the context of the local computing device 102 and the previously computed parameters received from the one or more remote computing devices. For example, the local computing device 102 may be utilized in any number of different locations 120, 140 based on a particular day of the week or a particular time of day. That is, the local computing device 102 may be operated in one location 120 (e.g., at an office building) during the week and in another location 140 (e.g., at home) on weekends. In each of the locations 120, 140, the local computing device 102 may establish a wireless connection to, or otherwise come into contact with, any number of different wireless access points 110. For example, while located in an office building during the week (e.g., location 120), the local computing device 102 may establish one or more wireless connections and/or come into contact with any number of the wireless access points 110 (e.g., AP 122, AP 124, AP 126, AP 128, AP 130, and AP 132). In contrast while located at home on weekends (e.g., location 140), the local computing device 102 may establish one or more wireless connections and/or come into contact with any number of different wireless access points 110 (e.g., AP 142, AP 144, AP 146, AP 148, AP 150, and AP 152). In such embodiments, the local computing device 102 may predict that a group 160, 170 of the wireless access points 110 is more likely to be available for re-establishment of a wireless connection at a particular time. For example, the local computing device 102 may determine that a group 160 of the wireless access points 110 (e.g., AP 122, AP 124, AP 126, and AP 128) is more likely to be available to re-establish a wireless connection than the other wireless access points 110 (e.g., AP 130 and AP 132) as a function of the time of day or the day of the week being predicted.

It should be understood that there may be any number of additional wireless access points 110 in either location 120, 140. In addition, it should be further understood that although only two different locations 120, 140 and types of locations (e.g., an office building and a home) are described in the illustrative embodiment, the local computing device 102 may establish a wireless connection to and/or come into contact with any number of different wireless access points 110 in any number of locations 120, 140 and/or any other type of location. For example, in some embodiments, the local computing device 102 may establish a wireless connection with one or more of the wireless access points 110 at an airport, a retail store, a restaurant, a hotel, and/or any other type of location including one or more of the wireless access points 110.

To reduce the amount of time needed to re-establish a wireless connection, the local computing device 102 may transmit a probe frame or a directed connection request to one or more of the wireless access points 110 as a function of the ordered list. If one or more of the wireless access points 110 are in range of the local computing device 102 when probed, the one or more in-range wireless access points 110 can generate and thereafter transmit a response to the probe frame. Upon receipt of a probe response, the local computing device 102 may re-establish a wireless connection with the corresponding wireless access point 110. By predicting and directly probing the wireless access points 110 that are most likely to be available to re-establish a wireless connection at a given time, the local computing device 102 need not initiate a wireless access point scan, which typically takes a noticeable amount of time to complete. In that way, the time needed to re-establish a wireless connection may be reduced.

The local computing device 102 may be embodied as any type of computing device for processing data and communicating with remote computing devices. In the illustrative embodiment of FIG. 2, the local computing device 102 includes a processor 204, an I/O subsystem 210, a memory 208, a data storage 212, communication circuitry 218, and one or more peripheral devices 220. In some embodiments, several of the foregoing components may be incorporated on a motherboard of the local computing device 102, while other components may be communicatively coupled to the motherboard via, for example, a peripheral port. Furthermore, it should be appreciated that the local computing device 102 may include other components, sub-components, and devices commonly found in a computing device, which are not illustrated in FIG. 2 for clarity of the description.

The processor 204 of the local computing device 102 may be embodied as any type of processor capable of executing software/firmware, such as a microprocessor, digital signal processor, microcontroller, or the like. The processor 204 is illustratively embodied as a single core processor having a processor core 206. However, in other embodiments, the processor 204 may be embodied as a multi-core processor having multiple processor cores 206. Additionally, the local computing device 102 may include additional processors 204 having one or more processor cores 206.

The I/O subsystem 210 of the local computing device 102 may be embodied as circuitry and/or components to facilitate input/output operations with the processor 204 and/or other components of the local computing device 102. In some embodiments, the I/O subsystem 210 may be embodied as a memory controller hub (MCH or "northbridge"), an input/output controller hub (ICH or "southbridge"), and a firmware device. In such embodiments, the firmware device of the I/O subsystem 210 may be embodied as a memory device for storing Basic Input/Output System (BIOS) data and/or instructions and/or other information (e.g., a BIOS driver used during booting of the local computing device 102). However, in other embodiments, I/O subsystems having other configurations may be used. For example, in some embodiments, the I/O subsystem 210 may be embodied as a platform controller hub (PCH). In such embodiments, the memory controller hub (MCH) may be incorporated in or otherwise associated with the processor 204, and the processor 204 may communicate directly with the memory 208 (as shown by the hashed line in FIG. 2). Additionally, in other embodiments, the I/O subsystem 210 may form a portion of a system-on-a-chip (SoC) and be incorporated, along with the processor 204 and other components of the local computing device 102, on a single integrated circuit chip.

The processor 204 is communicatively coupled to the I/O subsystem 210 via a number of signal paths. These signal paths (and other signal paths illustrated in FIG. 2) may be embodied as any type of signal paths capable of facilitating communication between the components of the local computing device 102. For example, the signal paths may be embodied as any number of wires, cables, light guides, printed circuit board traces, via, bus, intervening devices, point-to-point interconnects, and/or the like.

The memory 208 of the local computing device 102 may be embodied as, or otherwise include, one or more memory devices or data storage locations including, for example, dynamic random access memory devices (DRAM), synchronous dynamic random access memory devices (SDRAM), double-data rate synchronous dynamic random access memory device (DDR SDRAM), mask read-only memory (ROM) devices, erasable programmable ROM (EPROM), electrically erasable programmable ROM (EEPROM)

devices, flash memory devices, and/or other volatile and/or non-volatile memory devices. The memory 208 is communicatively coupled to the I/O subsystem 210 via a number of signal paths. Although only a single memory device 208 is illustrated in FIG. 2, the local computing device 102 may include additional memory devices in other embodiments. Various data and software may be stored in the memory device 208. For example, one or more operating systems (OS), applications, programs, libraries, and drivers that make up the software stack executed by the processor 204 may reside in memory 208 during execution.

The data storage 212 may be embodied as any type of device or devices configured for the short-term or long-term storage of data such as, for example, memory devices and circuits, memory cards, hard disk drives, solid-state drives, or other data storage devices. In some embodiments, the data storage 212 may be used to store data associated with past and present connections with one or more wireless access points such as, for example, the AP 122. Additionally or alternatively, the data storage 212 may also be used to store parameters used to facilitate predicting which of the one or more wireless access points 110 to connect to. To do so, the data storage 212 may include one or more databases such as, for example, a wireless connection database 214 and a local parameter database 216. In such embodiments, the wireless connection database 214 may comprise data associated with one or more wireless connections (e.g., connection start time and date, connection end time and date, connection duration, etc.) or information corresponding to one or more of the wireless access points 110 with which the local computing device 102 connects (e.g., service set identifier, wireless channel, media access control address, etc.). The local parameter database 216 may contain, in some embodiments, one or more prediction parameters computed using one or more algorithms.

The communication circuitry 218 of the local computing device 102 may be embodied as any number of devices and circuitry for enabling communications between the local computing device 102 and one or more remote computing devices (e.g., the remote analysis server 240, the remote computing device 250, etc.) over the network 230. For example, the communication circuitry 218 may be embodied as a network interface controller (NIC) in some embodiments. The communication circuitry 218 may be further configured to use any one or more, or combination thereof, communication protocols to communicate with the network 230 such as, for example, a cellular communication protocol (e.g., Wideband Code Division Multiple Access (W-CDMA)), a wireless network communication protocol (e.g., Wi-Fi®, WiMAX), a wired network communication protocol (e.g., Ethernet), and/or other communication protocols.

The network 230 may be embodied as any number of various wired and/or wireless communication networks. For example, the network 230 may be embodied as or otherwise include a local area network (LAN), a wide area network (WAN), a mobile network, or a publicly-accessible, global network such as the Internet. Additionally, the network 230 may include any number of additional devices to facilitate communication between the local computing device 102 and the remote computing devices 240, 250. For example, the communication circuitry 218 may wirelessly connect to the one or more wireless access points 110 (e.g. AP 122), which may be communicatively coupled to the network 230. In such embodiments, the communication circuitry 218 may communicate with the remote computing devices 240, 250 over the network 230 using the AP 122.

The peripheral devices 220 of the local computing device 102 may include any number of additional input/output devices, interface devices, and/or other peripheral devices. For example, the peripheral devices 220 may include a display for displaying content to a user, a keyboard, mouse, or other input/output peripheral devices. The peripheral devices 220 are communicatively coupled to the I/O subsystem 210 via a number of signal paths thereby allowing the I/O subsystem 210 and/or processor 204 to receive inputs from and send outputs to the peripheral devices 220.

The wireless access points 110 (e.g., AP 122) may be embodied as any type of computing and/or communication device capable of performing the functions described herein. As such, the wireless access points 110 may include various hardware and software components (e.g., a processor, memory, and communication circuitry) typically found in a computing device for communicating, storing, forwarding, maintaining, receiving, and transferring data over the network 230.

The remote analysis server 240 may be embodied as any type of server or similar computing device capable of performing the functions described herein. As such, the remote analysis server 240 may include devices and structures commonly found in servers such as processors, memory devices, communication circuitry, and data storages, which are not shown in FIG. 2 for clarity of the description. As discussed in more detail below, the remote analysis server 240 is configured to analyze information received from the local computing device 102 and thereby compute one or more parameters. The one or more parameters may later be used by the local computing device 102 to facilitate predicting which of the wireless access points 110, or a group 160, 170 of the wireless access points 110, is most likely to be in range of the local computing device 102 at a particular time. In some embodiments, the remote analysis server 240 is configured to compute the one or more parameters in cooperation with one or more other computing devices such as, for example, the remote computing device 250. The remote analysis server 240 may also include a remote parameter database 242. The remote parameter database 242 may contain, in some embodiments, one or more prediction parameters computed by the remote analysis server 240 using one or more algorithms.

The remote computing device 250 may be embodied as any type of computing device capable of performing the functions described herein. As such, the remote computing device 250 may include devices and structures commonly found in computing devices such as processors, memory devices, communication circuitry, and data storages, which are not shown in FIG. 2 for clarity of the description. As discussed in more detail below, similar to the remote analysis server 240, the remote computing device 250 is configured to compute one or more parameters, which may later be used by the local computing device 102 to facilitate predicting which of the wireless access points 110, or the group 160, 170 of the wireless access points 110, is most likely to be in range of the local computing device 102 at a particular time. To do so, the remote computing device 250 may either compute the parameters itself or compute the parameters in cooperation with the remote analysis server 240 as discussed above. In some embodiments, the remote computing device 250 may include a remote parameter database 252, which may be similar to the remote parameter database 242 of the remote analysis server 240. As such, the remote parameter database 252 of the remote computing device 250 may contain one or more prediction parameters computed by the remote computing device 250 using one or more algorithms.

Figure 3:
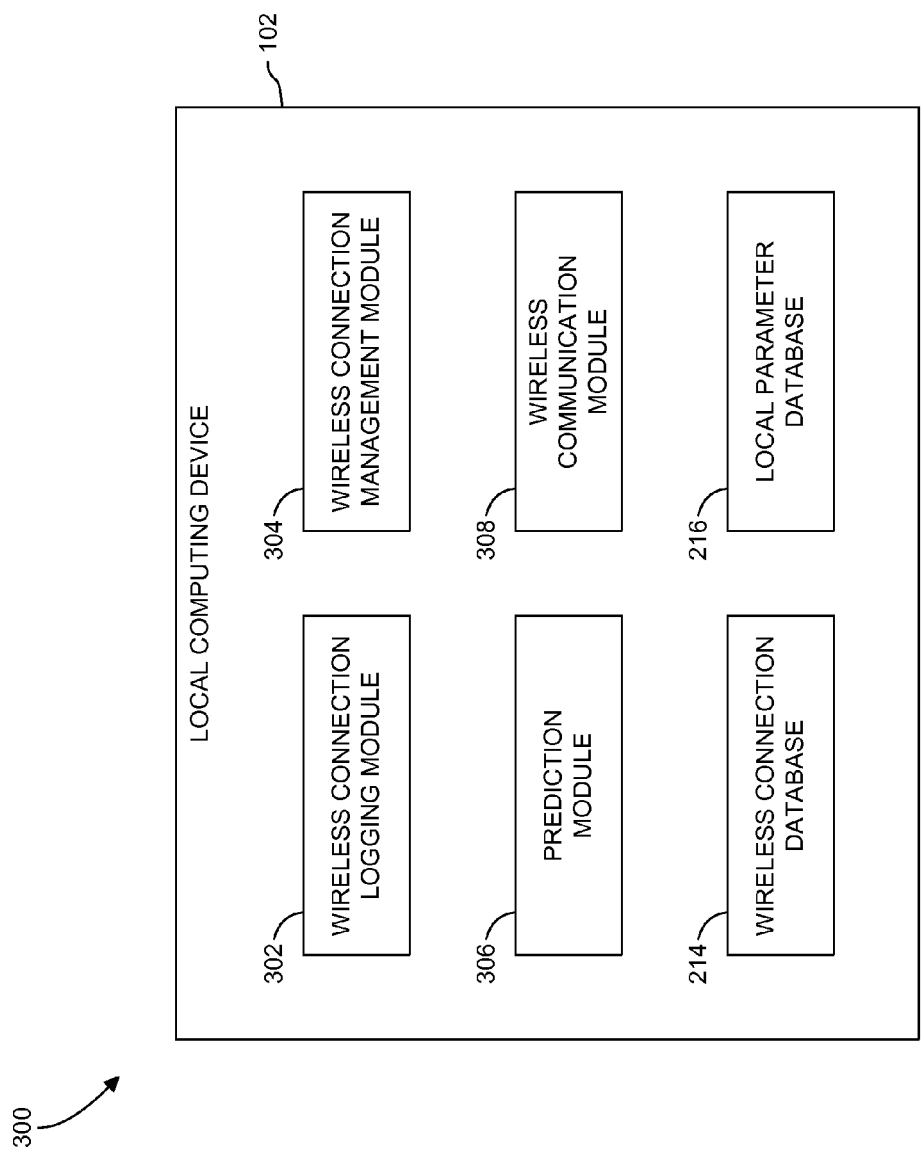
FIG. 3 is a simplified block diagram of at least one embodiment of an environment of the local computing device of FIGS. 1 and 2.

Referring now to FIG. 3, one embodiment of an environment 300 of the local computing device 102 includes a wireless connection logging module 302, a wireless connection management module 304, a prediction module 306, a wireless communication module 308, the wireless connection database 214, and the local parameter database 216. It should be understood that the environment 300, and/or any of the modules included therein, may be implemented in hardware, firmware, software, or any combination thereof.

As discussed above, in some embodiments, the local computing device 102 may establish a wireless connection with one or more of the wireless access points 110. To do so, the wireless communication module 308 may perform a scan to identify one or more wireless access points 110 located within proximity of the local computing device 102. In response to identifying one or more wireless access points 110 located within the proximity of the local computing device 102, the wireless communication module 308 may connect to one of the wireless access points 110. Additionally, in some embodiments, the wireless communication module 308 may re-establish a wireless connection with one or more of the wireless access points 110.

The wireless communication module 308 may be communicatively coupled to the wireless connection management module 304. The wireless connection management module 304 may facilitate establishing and/or re-establishing a connection with one or more of the wireless access points 110 using the wireless communication module 308. In use, the wireless connection management module 304 may instruct the wireless communication module 308 to initiate a scan to identify the wireless access points 110 located in the proximity of the local computing device 102. Additionally or alternatively, the wireless connection management module 304 may instruct the wireless communication module 308 to directly probe one or more of the wireless access points 110 instead of initiating a scan. For example, in some embodiments, the wireless connection management module 304 may instruct the wireless communication module 308 to send a probe to a reference number of the wireless access points 110 corresponding to the wireless access points 110 with which the local computing device 102 has the highest probability of reconnecting. In some embodiments, the wireless connection management module 304 may also instruct the wireless communication module 308 to directly probe one or more of the wireless access points 110 as a function of a manual wireless connection configuration provided by a user of the local computing device 102.

The wireless connection logging module 302 may record connection information corresponding to one or more past or present wireless connections established between the wireless communication module 308 and the one or more wireless access points 110. The connection information may include information describing the wireless connections themselves (e.g., connection start time and date, connection end time and date, connection duration, etc.) or information describing characteristics or data associated with the one or more wireless access points 110 with which the local computing device 102 connects (e.g., service set identifier, wireless channel, media access control address, etc.).

In some embodiments, the wireless connection logging module 302 may be configured to store the connection information in a log, which may be embodied as one or more databases. For example, the wireless connection logging module 302 may store the connection information in the wireless connection database 214. It should be understood that although the log is described as being embodied as a database in the illustrative embodiment, the log may be embodied as data stored in a data structure (e.g., a document, file, etc.) having a different format in other embodiments. For example, the log may be embodied as a comma-separated value (CSV) file, a text file, an encrypted data file, an Extensible Markup Language (XML) document having one or more XML elements, or any other format suitable to store information associated with one or more past or present wireless connections between the local computing device 102 and the one or more wireless access points 110. Additionally, it should be understood that the wireless connection logging module 302 may also be configured to store the connection information in any suitable data storage and/or memory device (e.g., volatile and/or non-volatile memory devices) of the local computing device 102.

At certain intervals, which may correspond to a pre-defined reference interval in some embodiments, the wireless connection management module 304 may retrieve historical connection information stored in the wireless connection database 214. The historical connection information may include connection information corresponding to one or more wireless connections previously recorded in the wireless connection database 214. The wireless connection management module 304, additionally or alternatively, may retrieve the historical connection information stored in the wireless connection database 214 in response to determining that the wireless communication module 308 is connected to the network 230 via one or more of the wireless access points 110. After retrieving the historical connection information from the wireless connection database 214, the wireless connection management module 304 may transmit the retrieved connection information over the network 230 to the remote analysis server 240 using the wireless communication module 308. As discussed in more detail below, the remote analysis server 240 may analyze the historical connection information received from the local computing device 102 and compute one or more parameters that may later be used to facilitate predicting which of the one or more wireless access points 110, or the group 160, 170 of the one or more wireless access points 110, is most likely (e.g., most probable) to be in range of the local computing device 102 at a given time. In some embodiments, the one or more parameters computed by the remote analysis server 240 may be embodied as one or more prediction programs (e.g., instructions, program sequences, etc.), which may be later executed by the prediction module 306 to facilitate predicting which of wireless access points 110, or the group 160, 170 of the wireless access points 110, are most likely (e.g., most probable) to be in range of the local computing device 102 at a given time.

In some embodiments, the wireless connection management module 304 may request that new and/or updated parameters be sent from the remote analysis server 240. The wireless connection management module 304 may do so in response to one or more events occurring or trigger conditions being met. For example, in some embodiments, the wireless connection management module 304 may be configured to monitor a signal strength between the wireless communication module 308 and one of the wireless access points 110, for example, the AP 122. In such embodiments, the wireless connection management module 304 may request that the remote analysis server send new and/or updated parameters in response to determining that the signal strength is equal to or below a reference signal strength threshold. The wireless connection management module 304 may instead request that the remote analysis server 240 send new and/or updated parameters in response to determining that one or more components of the local computing device 102 are being shutdown. Additionally or alternatively, the wireless connection management module 304 may request that the remote analysis server 240 send new and/or updated parameters at certain intervals, which may correspond to a predefined reference interval. It should be understood that the wireless connection management module 304 may request new and/or updated parameters be sent from the remote analysis server 240 in response to the occurrence of any other suitable event or trigger condition (e.g., battery level of the local computing device 102, impending loss of connectivity to the network 230, at a particular day of the week, at a particular time, in response to a manual request by a user of the local computing device 102, etc.).

In response to receiving new and/or updated parameters from the remote analysis server 240, the wireless connection management module 304 may be configured to locally store the new and/or updated parameters in one or more databases. For example, the wireless connection management module 304 may store the new and/or updated parameters in the local parameter database 216. Of course, it should be understood that the wireless connection management module 304 may also be configured to store the parameters in any suitable data storage and/or memory device (e.g., volatile and/or non-volatile memory devices) of the local computing device 102. Additionally, it should be understood that in embodiments wherein the parameters computed by the remote analysis server 240 are embodied as prediction programs, the wireless connection management module 304 may be configured to request new and/or updated prediction programs from the remote analysis server 240 and thereafter store the new and/or updated prediction programs in the local parameter database 216.

To facilitate predicting which of the one or more wireless access points 110, or the group 160, 170 of the one or more wireless access points 110, is most likely (e.g., most probable) to be in range of the local computing device 102 at a given time, the prediction module 306 may be communicatively coupled to the wireless connection management module 304, the wireless connection database 214, and the local parameter database 216. In use, the prediction module 306 may receive a notification and/or an indication from the wireless connection management module 304 that re-establishment of a wireless connection has been requested.

In response, the prediction module 306 may retrieve the one or more parameters and/or prediction programs from the local parameter database 216. Additionally, the prediction module 306 may retrieve the most recent connection information from the wireless connection database 214. In some embodiments, the most recent connection information retrieved from the wireless connection database 214 may comprise information corresponding one or more recent wireless connections for which the remote analysis server 240 has not yet computed into a parameter or a prediction program.

In use, the prediction module 306 may predict different groups 160, 170 of the wireless access points 110 being most likely to be in range of or otherwise available to the local computing device 102 at a desired day of the week and/or time of prediction. In some embodiments, the previously computed parameters received from the remote analysis server 240 are embodied as numeric constants indicative of connection probabilities derived from the historical connection information. In such embodiments, the prediction module 306 may use the received parameters, the most recent connection information retrieved from the wireless connection database 214, and a desired time of prediction as inputs into a generic (e.g., standard, predefined, default, common, etc.) algorithm or formula to generate an ordered list. Thereafter, the prediction module 306 may retrieve parameters from the local parameter database 216 that correspond to the desired day of the week and/or time of prediction, but that occurred in the past (e.g., parameters generated from historical connection information). For example, if the prediction module 306 determines that the desired day of the week and/or time of prediction corresponds to the present day of the week and time (e.g., Tuesday at 5:00 PM), then the prediction module 306 may retrieve a set of previously computed parameters for the same day of the week and time using the historical connection information (e.g., the last four Tuesdays at 5:00 PM, the last three Tuesdays at 5:00 PM, etc.).

The prediction module 306 may then determine which of the most recent wireless connections are most likely to be available for reconnection at the desired time of prediction (e.g., Tuesday at 5:00 PM). To do so, the prediction module 306 may assign the connection probabilities associated with each of the previously computed parameters (e.g., 0.4, 0.35, 0.25) to the most recent connection information. For example, the prediction module 306 may assign a probability of 0.4 to the last (e.g., the previous) wireless connection that was established (e.g., Tuesday at 3:00 PM, Monday at 10:00 PM, etc.), a probability of 0.35 to the wireless connection that was established 24 hours before (e.g., Monday at 5:00 PM) the desired time of prediction (e.g., Tuesday at 5:00 PM), and a probability of 0.25 to the wireless connection what was established one week before (e.g., 'last' Tuesday at 5:00 PM) the desired time of prediction (e.g., Tuesday at 5:00 PM).

In response to determining which of the most recent wireless connections are most likely to be available for reconnection at the desired time (e.g., Tuesday at 5:00 PM), the prediction module 306 may identify which of the wireless access points 110 (e.g., AP 122, AP 124, AP 126, etc.) correspond to those wireless connections and generate the ordered list therefrom. To do so, the prediction module 306 may use any information describing the characteristics or data associated with the corresponding wireless access points 110 (e.g., service set identifier, wireless channel, media access control address, etc.) to facilitate identification. The resulting ordered list may therefore comprise a reference number of the wireless access points 110 having the highest probabilities of being available for reconnection (e.g., the top three wireless access points 110). In some embodiments, the ordered list of the wireless access points 110 may be arranged in a descending order according to the probability determined for each.

In embodiments wherein the previously computed parameters received from the remote analysis server 240 are instead embodied as one or more prediction programs (e.g., instructions, program sequences, etc.), the prediction module 306 may execute the previously generated prediction programs using the most recent connection information retrieved from the wireless connection database 214 and the desired time of prediction as inputs to generate the ordered list of the wireless access points 110. In such embodiments, the resulting ordered list may similarly comprise a reference number of the wireless access points 110 having the highest probabilities of being available for reconnection (e.g., the top three wireless access points 110). Additionally or alternatively, the ordered list of the wireless access points 110 may be arranged in a descending order according to the probability determined for each.

To reduce the amount of time needed to re-establish a wireless connection, the wireless connection management module 304 may instruct the wireless communication module 308 to transmit a probe or a directed connection request to one or more of the wireless access points 110 as a function of the ordered list. If one or more of the wireless access points 110 are in range of, or are otherwise available to, the local computing device 102 when probed, the one or more in-range wireless access points 110 can generate and thereafter transmit a response to the probe. Upon receipt of a probe response, the wireless connection management module 304 may instruct the wireless communication module 308 to re-establish a wireless connection with the wireless access point 110 that generated the response. By predicting and directly probing the wireless access points 110 that are most likely to be available to re-establish a wireless connection at a given time, the local computing device 102 need not scan for available wireless access points, which typically takes a noticeable amount of time to complete. In that way, the time needed to re-establish a wireless connection may be reduced. If, however, none of the wireless access points 110 are in range of or otherwise available to the local computing device 102 when probed, the wireless connection management module 304 may instead instruct the wireless communication module 308 to initiate a scan to identify other wireless access points 110 located in the proximity of the local computing device 102. Additionally, since the local computing device 102 off-loads the analysis of historical connection information and generation of parameters to the remote analysis server 240, the resources and processing capacity of the local computing device 102 may be preserved.

Referring now to FIG. 4, one embodiment of an environment 400 of the remote analysis server 240 includes a remote analysis module 402, a communication module 404, and the remote parameter database 242. It should be understood that the environment 400, and/or any of the modules included therein, may be implemented in hardware, firmware, software, or any combination thereof.

The communication module 404 may facilitate communications between the remote analysis server 240 and the local computing device 102 over the network 230. For example, in some embodiments, the communication module 404 may receive historical connection information sent for analysis by the local computing device 102. The communication module 404 may also transmit one or more parameters computed from the historical connection information to the local computing device 102.

As discussed, the remote analysis server 240 may be configured to compute one or more parameters, which may later be used by the local computing device 102 to facilitate predicting which of the one or more wireless access points 110, or the group 160, 170 of the one or more wireless access points 110, is most likely to be in range of the local computing device 102 at a particular time. To do so, the remote analysis module 402 of the remote analysis server 240 may utilize one or more artificial intelligence-based techniques to compute or otherwise generate the parameters as a function of the historical connection information received from the local computing device 102. For example, the remote analysis module 402 may utilize one or more genetic algorithms to compute a set of parameters in some embodiments. In such embodiments, each parameter in the set of parameters may be computed from the historical connection information received from the local computing device 102. As such, each parameter may be embodied as a numeric constant that represents a probability of a previous wireless connection having occurred. For example, the set of parameters computed by the remote analysis module 402 may include: a parameter indicative of the probability that a wireless connection established at a particular time of reference was the same as the last wireless connection (e.g., the previous wireless connection) that was established; a parameter indicative of the probability that the wireless connection established at the particular time of reference was the same as the wireless connection that was established 24 hours before the particular time of reference; and a parameter indicative of the probability that the wireless connection established at the particular time of reference was the same as the wireless connection that was established one week before the particular time of reference. In that way, the remote analysis module 402 may compute [0.4, 0.35, 0.25] as the set of parameters, wherein 0.4 may be indicative of the probability that the wireless connection established at the particular time of reference (e.g., Tuesday at 5:00 PM) was the same as the last wireless connection that was established (e.g., Tuesday at 3:00 PM, Monday at 10:00 PM, etc.); 0.35 may be indicative of the probability that the wireless connection established at the particular time of reference (e.g., Tuesday at 5:00 PM) was the same as the wireless connection that was established 24 hours before (e.g., Monday at 5:00 PM) the particular time of reference; and 0.25 may be indicative of the probability that the wireless connection established at the particular time of reference (e.g., Tuesday at 5:00 PM) was the same as the wireless connection that was established one week before (e.g., 'last' Tuesday at 5:00 PM) the particular time of reference.

It should be understood that although only three parameters are computed by the remote analysis module 402 in the illustrative embodiment, any number of different parameters having different probabilities may be computed in other embodiments. For example, the remote analysis module 402 of some embodiments may compute a parameter indicative of the probability that the wireless connection established at a particular time of reference was the same as the wireless connection that was established one hour before the particular time of reference, a parameter indicative of the probability that the wireless connection established at a particular time of reference was the same as the wireless connection that was established one month before the particular time of reference, or any additional parameter suitable for indicating the probability that a wireless connection established at a particular time was the same as another wireless connection established in the past.

In some embodiments, the remote analysis module 402 may utilize one or more genetic programming techniques to compute a set of parameters. In such embodiments, each parameter in the set of parameters may instead be embodied as one or more prediction programs (e.g., instructions, program sequences, etc.), which may be later executed by local computing device 102 to facilitate predicting which of wireless access points 110, or the group 160, 170 of the wireless access points 110, are most likely (e.g., most probable) to be in range of the local computing device 102 at a given time.

It should be understood that although only genetic algorithms and genetic programming techniques are described as being capable of being utilized to compute the parameters and/or generate the prediction programs in the illustrative embodiment, the remote analysis module 402 may utilize any other technique suitable for computing parameters or generating prediction programs that later facilitate the local computing device 102 predicting which of the one or more wireless access points 110, or the group 160, 170 of the one or more wireless access points 110, is most likely (e.g., most probable) to be in range of the local computing device 102 at a given time. For example, the remote analysis module 402 may compute, generate, and/or determine one or more algorithms best suited (e.g., most optimal) for later use by the local computing device 102 in predicting which of the one or more wireless access points 110, or the group 160, 170 of the one or more wireless access points 110, is most likely (e.g., most probable) to be in range of the local computing device 102 at a given time.

In some embodiments, the remote analysis module 402 may be configured to store the computed parameters and/or generated prediction programs in one or more databases. For example, the remote analysis module 402 may store the computed parameters and/or generated prediction programs in the remote parameter database 242. Of course, it should be understood that the remote analysis module 402 may also be configured to store the computed parameters and/or generated prediction programs in any suitable data storage and/or memory device (e.g., volatile and/or non-volatile memory devices) of the remote analysis server 240.

Figure 5:
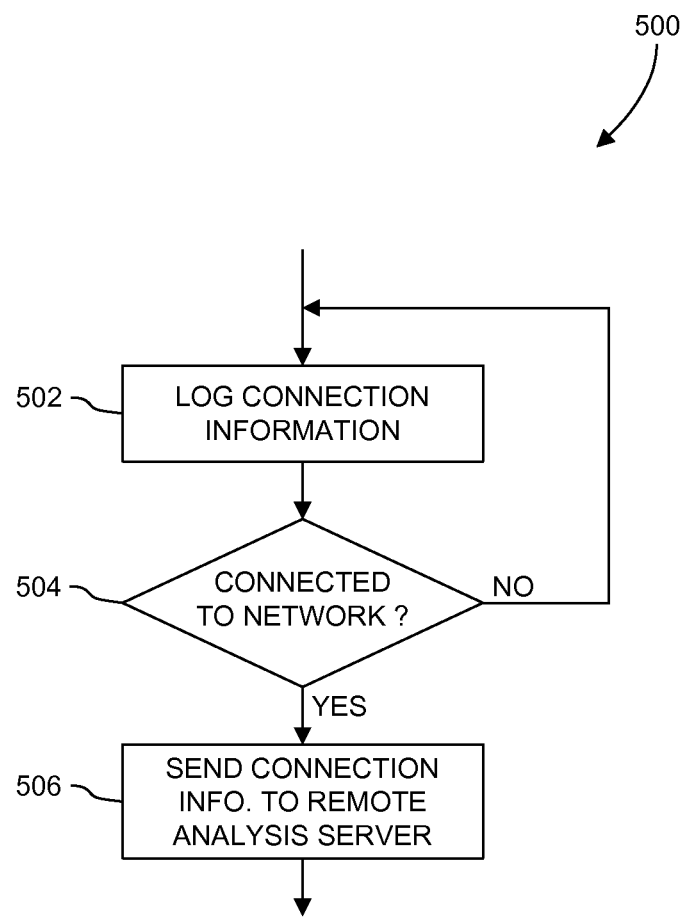
FIG. 5 is a simplified block diagram of at least one embodiment of a method for logging wireless connection information with the local computing device of FIGS. 1 and 2 and sending the wireless connection information to the remote analysis server of FIGS. 2 and 4.

Referring now to FIG. 5, at least one embodiment of a method 500 for logging wireless connection information with the local computing device 102 and sending the wireless connection information to the remote analysis server 240 for analysis begins with block 502. In block 502, the local computing device 102 may record connection information corresponding to one or more past or present wireless connections established between the local computing device 102 and the one or more wireless access points 110. The connection information may comprise information describing the wireless connections themselves (e.g., connection start time and date, connection end time and date, connection duration, etc.) or information describing characteristics or data associated with the one or more wireless access points 110 with which the local computing device 102 connects (e.g., service set identifier, wireless channel, media access control address, etc.). The local computing device 102 may store the recorded connection information in a database (e.g., the wireless connection database 214). In some embodiments, the connection information may also be stored in a log file or in any other format suitable to store information associated with one or more past or present wireless connections between the local computing device 102 and the one or more wireless access points 110.

At block 504, the local computing device 102 may determine whether a connection to the network 230 via one or more of the wireless access points 110 exists. To do so, the local computing device 102 may monitor for the establishment of a wireless connection with one or more of the wireless access points 110. In some embodiments, the local computing device 102 may be configured to utilize the information stored in the wireless connection database 214 to facilitate determining whether a connection to the network 230 exists. If the local computing device 102 determines that a connection to the network 230 exists, the method 500 advances to block 506. If, however, the local computing device 102 determines that a connection to the network 230 does not exist, the method 500 loops back to block 502 and continues logging connection information.

At block 506, the local computing device 102 retrieves historical connection information stored in the wireless connection database 214. The historical connection information may include connection information corresponding to one or more wireless connections previously recorded in the wireless connection database 214 by the local computing device 102. After retrieving the historical connection information from the wireless connection database 214, the local computing device 102 transmits the retrieved connection information over the network 230 to the remote analysis server 240.

Figure 6:
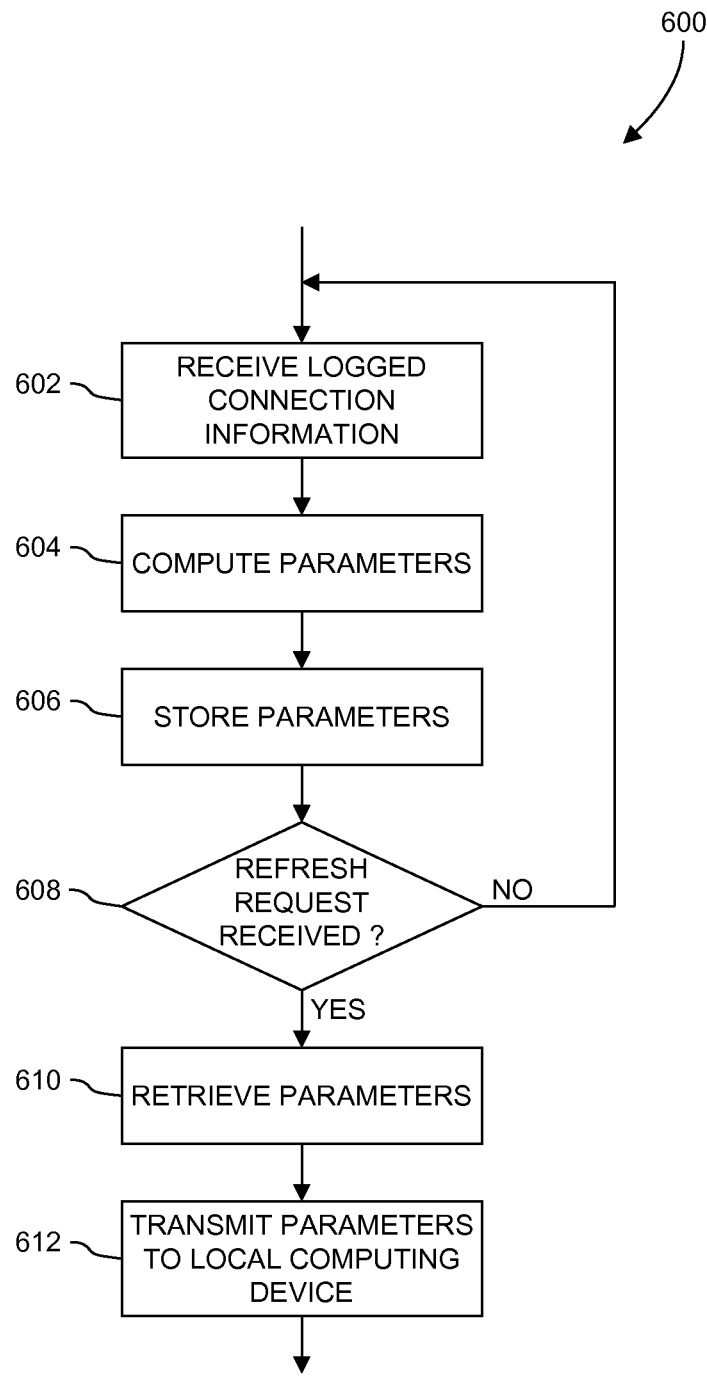
FIG. 6 is a simplified flow diagram of at least one embodiment of a method for analyzing historical connection information with the remote analysis server of FIGS. 2 and 4 to compute parameters and thereafter send the computed parameters to the local computing device of FIGS. 1 and 2.

Referring now to FIG. 6, at least one embodiment of a method 600 for analyzing historical connection information with the remote analysis server 240 to compute parameters and thereafter send the computed parameters to the local computing device 102 begins with block 602. In block 602, the remote analysis server 240 receives historical connection information sent over the network 230 by the local computing device 102. The method 600 then advances to block 604.

In block 604, the remote analysis server 240 computes one or more parameters and/or prediction programs, which may later be used by the local computing device 102 to facilitate predicting which of the one or more wireless access points 110, or the group 160, 170 of the one or more wireless access points 110, is most likely to be in range of the local computing device 102 at a particular time (e.g., a desired time of prediction). To do so, the remote analysis server 240 may utilize one or more artificial intelligence-based techniques to compute or otherwise generate the parameters and/or prediction programs a function of the historical connection information received from the local computing device 102. In some embodiments, the remote analysis server 240 utilizes one or more genetic algorithms and/or genetic programming techniques to generate the parameters and/or prediction programs. Each parameter and/or prediction program may be indicative of or otherwise correspond to a different connection probability computed from the received historical connection information. At completion, or at any appropriate time during computation, the method 600 advances to block 606 in which the remote analysis server 240 stores the computed parameters and/or prediction programs in one or more databases (e.g., the remote parameter database 242). Upon storing the computed parameters and/or prediction programs in one or more databases, the method 600 advances to block 608.

At block 608, the remote analysis server 240 determines whether a request to refresh parameters has been received from the local computing device 102. The request to refresh parameters received from the local computing device 102 may be embodied as a request from the local computing device 102 to be sent new and/or updated parameters. If the remote analysis server 240 determines a request for new and/or updated parameters has been received from the local computing device 102, the method 600 advances to block 610. If, however, the remote analysis server 240 determines a request for new and/or updated parameters has not been received from the local computing device 102, the method 600 loops back to block 602.

In block 610, the remote analysis server 240 retrieves any new and/or updated parameters from the remote parameter database 242. Upon retrieving new and/or updated parameters from the remote parameter database 242, the remote analysis server 240 transmits the new and/or updated parameters to the local computing device 102, which may later be used to facilitate predicting which of the one or more wireless access points 110, or the group 160, 170 of the one or more wireless access points 110, is most likely (e.g., most probable) to be in range of the local computing device 102 at a given time.

It should be understood that although the remote analysis server 240 performs the method 600 in the illustrative embodiment of FIG. 6, other devices may instead perform all or a portion of the method 600 in other embodiments. For example, in some embodiments, the remote analysis server 240 may perform the method 600 in cooperation with the remote computing device 250. In that way, the remote analysis server 240 and the remote computing device 250 may each analyze a portion of the historical connection information sent by the local computing device 102 and thereby compute the parameters. To do so, the local computing device 102 may send the historical connection information to the remote analysis server 240, which in turn may send a portion of the received historical connection information to the remote computing device 250. The remote computing device 250 may analyze the portion of the historical connection information received from the remote analysis server 240 and thereafter return the results to the remote analysis server 240 for further processing (e.g., aggregation, further analysis, computation of parameters, etc.). In some embodiments, the remote computing device 250 may instead implement the method 600 in the illustrative embodiment of FIG. 6. In such embodiments, the local computing device 102 may send the historical connection information to the remote computing device 250 rather than the remote analysis server 240. In response, the remote computing device 250 may analyze the historical connection information sent by the local computing device 102 to compute the parameters, which are subsequently sent to the local computing device 102.

Referring now to FIG. 7, at least one embodiment of a method 700 for requesting new parameters from the remote analysis server 240 using the local computing device 102 begins with block 702. In block 702, the local computing device 102 determines if one or more locally stored parameters should be refreshed. The local computing device 102 may do so in response to determining that one or more events have occurred or trigger conditions have been met. For example, in some embodiments, the local computing device 102 may be configured to monitor the signal strength of a wireless communication channel established between the local computing device 102 and one of the wireless access points 110, for example, the AP 122. In such embodiments, the local computing device 102 may determine that one or more locally stored parameters should be refreshed in response to detecting that the signal strength is equal to or below a reference signal strength threshold. It should be understood that the local computing device 102 may determine that one or more locally stored parameters should be refreshed in response to the occurrence of any other suitable event or trigger condition (e.g., battery level of the local computing device 102, impending loss of connectivity to the network 230, on a particular day of the week, at a particular time, in response to a manual request by a user of the local computing device 102, etc.). If the local computing device 102 determines that one or more locally stored parameters should be refreshed, the method 700 advances to block 704. If, however, the local computing device 102 determines that none of the locally stored parameters should be refreshed, the method 700 loops back to block 702 in which the local computing device continues determining if one or more locally stored parameters should be refreshed. In block 704, the local computing device 102 requests that new and/or updated parameters be sent by the remote analysis server 240. To do so, the local computing device 102 may transmit the request to the remote analysis server 240 over the network 230. The method 700 then advances to block 706.

In block 706, the local computing device 102 receives the requested new and/or updated parameters from the remote analysis server 240 over the network 230. In some embodiments, the local computing device 102 locally stores the new and/or updated parameters received from the remote analysis server 240 in a local parameter database 216 to later facilitate predicting which of the one or more wireless access points 110, or the group 160, 170 of the one or more wireless access points 110, is most likely (e.g., most probable) to be in range of the local computing device 102 at a given time. In embodiments wherein other devices (e.g., the remote computing device 250) perform all or a portion of the analysis and computation of parameters from the historical connection information, the local computing device 102 may instead send the request for new parameters to those other devices (e.g., the remote computing device 250), which subsequently provide the new parameters to the local computing device 102.

Referring now to FIG. 8, at least one embodiment of a method 800 for using the parameters received from the remote analysis server 240 to predict an available wireless access point for reconnection with the local computing device 102 begins with block 802. In block 802, the local computing device 102 determines whether re-establishment of a wireless connection has been requested. To do so, the local computing device 102 may monitor, in some embodiments, for input received from a user via one or more of the peripheral devices 220 (i.e., keypads, touch screens, voice recognition components, etc.) of the local computing device 102. The input may be indicative of a request by the user to re-establish a wireless connection with one of the wireless access points 110. Additionally or alternatively, the local computing device 102 may monitor for a notification and/or indication generated by one or more components or operations of the local computing device 102. For example, the local computing device 102 may monitor for an indication from one or more components that the local computing device 102 is initializing (e.g., powering on, turning on, booting, waking from a sleep or a suspended state, etc.). If the local computing device 102 determines that re-establishment of a wireless connection has been requested, the method 800 advances to block 804. If the local computing device 102 instead determines that re-establishment of a wireless connection has not been requested, the method 800 proceeds back to block 802.

At block 804, the local computing device 102 retrieves the previously computed parameters and the historical connection information to facilitate predicting one or more of the wireless access points may be available for re-establishing a connection. To do so, the local computing device 102 retrieves, at block 806, one or more parameters and/or prediction programs from the local parameter database 216. As discussed above, the one or more parameters and/or prediction programs stored in the local parameter database 216 correspond to the one or more parameters and/or prediction programs previously computed by and received from the remote analysis server 240 and/or the remote computing device 250. Additionally, the local computing device 102 retrieves, at block 808, the most recent connection information from the wireless connection database 214. In some embodiments, the most recent connection information retrieved from the wireless connection database 214 may comprise information describing one or more recent wireless connections for which the remote analysis server 240 and/or the remote computing device 250 has not yet computed into a parameter or a prediction program. After retrieving the parameters and the most recent connection information, the method 800 advances to block 810.

In block 810, the local computing device 102 generates an ordered list comprising a reference number of the wireless access points 110 having the highest probabilities of being available for reconnection. For example, the local computing device 102 may generate an ordered list comprising the top three wireless access points 110, which may correspond to the three wireless connections having the highest determined probabilities of being available to re-establish a wireless connection. In some embodiments, the ordered list of the wireless access points 110 may be arranged in a descending order according to the probability determined for each. Upon generating the ordered list, the method 800 advances to block 812.

In block 812, the local computing device 102 transmits a probe or a directed connection request to one or more of the wireless access points 110 of the ordered list. In some embodiments, the local computing device 102 may transmit probes in a descending order according to the probability determined for each of the wireless access points 110 of the ordered list. As such, the local computing device 102 may first transmit a probe to the wireless access point 110 having the highest determined probability of being available to re-establish a wireless connection before transmitting a probe to another wireless access point 110 of the ordered list. For example, if the ordered list generated by the local computing device 102 comprises four of the wireless access points 110 (e.g., AP 122, AP 124, AP 126, and AP 128), the local computing device 102 may first transmit a probe to the AP 122 before transmitting a probe to the AP 124, AP 126, or AP 128. The method 800 then advances to block 814.

In block 814, the local computing device 102 determines whether it received a response to the probe from the wireless access point 110 to which the probe was directed. That is, if the wireless access point 110 to which the probe was directed (e.g., AP 122) is in range and available to re-establish a wireless connection with the local computing device 102, the wireless access point 110 to which the probe was directed (e.g., AP 122) may transmit a response to the probe, which may be received by the local computing device 102. If the local computing device 102 receives a response from the wireless access point 110 to which the probe was directed, the method 800 advances to block 816. If, however, the local computing device 102 does not receive a response from the wireless access point 110 to which the probe was directed, the method 800 advances instead to block 818.

In block 818, the local computing device 102 determines whether the wireless access point 110 to which the probe was directed is the last wireless access point 110 of the ordered list. If the local computing device 102 determines that the wireless access point 110 to which the probe was directed is not the last wireless access point 110 of the ordered list, the method 800 returns to block 812 to probe the next wireless access point 110 of the ordered list (e.g., the wireless access point 110 having the next highest probability). If, however, the local computing device 102 determines that the wireless access point 110 to which the probe was directed is the last wireless access point 110 of the ordered list, the method 800 advances to block 820. In block 820, the local computing device 102 initiates a scan to identify other wireless access points 110 located in the proximity of the local computing device 102.

In block 816, the local computing device 102 may re-establish a wireless connection with the wireless access point 110 to which the probe was directed and a response was received therefrom. By predicting and directly probing the wireless access points 110 that are most likely to be available to re-establish a wireless connection at a given time, the local computing device 102 need not scan for available wireless access points 110, which typically takes a noticeable amount of time to complete. In that way, the time needed to re-establish a wireless connection may be reduced. Additionally, since the local computing device 102 off-loads the analysis of historical connection information and generation of parameters to the remote analysis server 240, the resources and processing capacity of the local computing device 102 may be preserved.

It should be understood that although the local computing device 102 of the illustrative embodiment transmits probes in a descending order according to the probability determined for each of the wireless access points 110 of the ordered list, the local computing device 102 may also contemporaneously (e.g., simultaneously) transmit a probe to each wireless access point 110 of the ordered list in some embodiments. In such embodiments, the local computing device 102 may instead determine, at block 814, whether it received a response to the probes from any one of the wireless access points 110 to which the probes were directed. If the local computing device 102 receives a response from any one of the wireless access points 110 to which the probes were directed, the local computing device 102 may re-establish a wireless connection with one or more of the wireless access points 110 that transmitted a response. In some embodiments, the local computing device 102 may re-establish a wireless connection with the wireless access point 110 first to respond to the probe. It should be understood, however, that the local computing device 102 may instead determine to re-establish a wireless connection with any of the one or more wireless access points 110 according to a policy (e.g., strongest signal strength, device security policies, user preferences, etc.) or any other suitable mechanism for selecting one of the responding wireless access points 110 with which to re-establish a wireless connection.

EXAMPLES

Illustrative examples of the devices, systems, and methods disclosed herein are provided below. An embodiment of the devices, systems, and methods may include any one or more, and any combination of, the examples described below.

Example 1 includes a local computing device for reducing a connection time to a wireless access point. The local computing device including a wireless connection logging module to record in a log stored on the local computing device, wireless connection information for a plurality of wireless connections with one or more wireless access points, the log including historical wireless connection information and recent wireless connection information; a wireless connection management module to (i) retrieve the historical connection information stored on the local computing device, (ii) transmit the retrieved historical connection information over a network to a remote analysis server, and (iii) receive parameters calculated as a function of the historical connection information from the remote analysis server; a prediction module to generate an ordered list from the one or more wireless access points to connect to at a desired time as a function of the received parameters and the recent wireless connection information, the recent wireless connection information including wireless connection information not yet used in calculation of the parameters, wherein the wireless connection management module further to select a first wireless access point from the ordered list with which to attempt a connection; and a wireless communication module to send a probe frame to the selected first wireless access point.

Example 2 includes the subject matter of Example 1, and wherein each received parameter includes a prediction program generated using a genetic programming operation, and wherein to generate an ordered list from the one or more wireless access points to connect to at a desired time includes to execute the prediction program for each received parameter to generate the ordered list from the one or more wireless access points.

Example 3 includes the subject matter of any of Examples 1 and 2, and wherein each received parameter includes a probability computed as a function of the historical wireless connection information.

Example 4 includes the subject matter of any of Examples 1-3, and wherein the prediction module further to assign the probability computed for each received parameter to a different recent wireless connection of the plurality of wireless connections recorded in the log.

Example 5 includes the subject matter of any of Examples 1-4, and wherein the prediction module further to identify a wireless access point corresponding to each recent wireless connection recorded in the log.

Example 6 includes the subject matter of any of Examples 1-5, and wherein the ordered list including the one or more wireless access points arranged in descending order according to the corresponding probability assigned to each different recent wireless connection recorded in the log.

Example 7 includes the subject matter of any of Examples 1-6, and wherein to identify a wireless access point corresponding to each recent wireless connection recorded in the log includes to identify a wireless access point corresponding to each recent wireless connection recorded in the log as a function of one or more of a service set identifier, a wireless channel, and a media access control address associated with each wireless access point recorded in the log.

Example 8 includes the subject matter of any of Examples 1-7, and wherein the wireless connection management module further to establish a connection with the selected first wireless access point in response to the wireless communication module receiving a response to the probe frame from the selected first wireless access point.

Example 9 includes the subject matter of any of Examples 1-8, and wherein the wireless connection management module further to select a second wireless access point from the ordered list with which to attempt a connection in response to the wireless communication module not receiving a response to the probe frame from the first wireless access point.

Example 10 includes the subject matter of any of Examples 1-9, and wherein the wireless communication module to send a probe frame to the first wireless access point includes to send a first probe frame to the first wireless access point, and wherein the wireless connection management module further to send a second probe frame to the selected second wireless access point in response to not receiving a response to the first probe frame from the first wireless access point.

Example 11 includes the subject matter of any of Examples 1-10, and wherein the wireless connection management module further to initiate a scan to locate one or more other wireless access points in response to the wireless communication module not receiving a response to the probe frame from any of the wireless access points of the ordered list.

Example 12 includes the subject matter of any of Examples 1-11, and wherein to send a probe frame to the selected first wireless access point includes to send a first probe frame to the selected first wireless access point, and wherein the wireless connection management module further to select a second wireless access point and a third wireless access point from the ordered list with which to attempt a connection, and wherein the wireless communication module further to send a second probe frame to the selected second wireless access point and a third probe frame to the selected third wireless access point contemporaneously with sending the first probe frame to the selected first wireless access point, and wherein the wireless connection management module further to establish a connection with one of the selected first, second, or third wireless access points in response to the wireless communication module receiving a response to the probe frame from one of the corresponding selected first, second, or third wireless access points.

Example 13 includes the subject matter of any of Examples 1-12, and wherein the wireless connection management module further to request new or updated parameters from the remote analysis server.

Example 14 includes the subject matter of any of Examples 1-13, and wherein the wireless connection management module further to (i) monitor a signal strength between the wireless communication module and one or more of the wireless access points and (ii) determine whether the signal strength is equal to or below a reference signal strength threshold; and wherein to request new or updated parameters from the remote analysis server includes to request new or updated parameters from the remote analysis server in response to determining that the signal strength is equal to or below the reference signal strength threshold.

Example 15 includes the subject matter of any of Examples 1-14, and wherein the wireless connection management module further to determine whether one or more components of the local computing device are shutting down; and wherein to request new or updated parameters from the remote analysis server includes to request new or updated parameters from the remote analysis server in response to determining that one or more components of the local computing device are shutting down.

Example 16 includes a method for reducing a connection time to a wireless access point. The method includes recording, on a local computing device, in a log stored on the local computing device, wireless connection information for a plurality of wireless connections with one or more wireless access points, the log including historical wireless connection information and recent wireless connection information; retrieving, on the local computing device, the historical connection information stored on the local computing device transmitting, on the local computing device, the retrieved historical connection information over a network to a remote analysis server receiving, on the local computing device, parameters calculated as a function of the historical connection information from the remote analysis server; generating, on the local computing device, an ordered list from the one or more wireless access points to connect to at a desired time as a function of the received parameters and the recent wireless connection information, the recent wireless connection information including wireless connection information not yet used in calculation of the received parameters; selecting, on the local computing device, a first wireless access point from the ordered list with which to attempt a connection; and sending, on the local computing device, a probe frame to the selected first wireless access point.

Example 17 includes the subject matter of Example 16, and wherein each received parameter includes a prediction program generated using a genetic programming operation, and wherein generating an ordered list from the one or more wireless access points to connect to at a desired time includes executing the prediction program from each received parameter to generate the ordered list from the one or more wireless access points.

Example 18 includes the subject matter of any of Examples 16 and 17, and wherein each received parameter includes a probability computed as a function of the historical wireless connection information.

Example 19 includes the subject matter of any of Examples 16-18, and further including assigning, on the local computing device, the probability computed for each received parameter to a different recent wireless connection of the plurality of wireless connections recorded in the log.

Example 20 includes the subject matter of any of Examples 16-19, and further including identifying, on the local computing device, a wireless access point corresponding to each recent wireless connection recorded in the log.

Example 21 includes the subject matter of any of Examples 16-20, and wherein the ordered list including the one or more wireless access points arranged in descending order according to the corresponding probability assigned to each different recent wireless connection recorded in the log.

Example 22 includes the subject matter of any of Examples 16-21, and wherein identifying a wireless access point corresponding to each recent wireless connection recorded in the log includes indentifying a wireless access point corresponding to each recent wireless connection recorded in the log as a function of one or more of a service set identifier, a wireless channel, and a media access control address associated with each wireless access point recorded in the log.

Example 23 includes the subject matter of any of Examples 16-22, and further including establishing, on the local computing device, a connection with the selected first wireless access point in response to receiving a response to the probe frame from the selected first wireless access point.

Example 24 includes the subject matter of any of Examples 16-23, and further including selecting, on the local computing device, a second wireless access point from the ordered list with which to attempt a connection in response to not receiving a response to the probe frame from the first wireless access point.

Example 25 includes the subject matter of any of Examples 16-24, and wherein sending a probe frame to the first wireless access point includes sending a first probe frame to the first wireless access point, and wherein the method further includes sending, on the local computing device, a second probe frame to the selected second wireless access point in response to not receiving a response to the first probe frame from the first wireless access point.

Example 26 includes the subject matter of any of Examples 16-25, and further including initiating, on the local computing device, a scan to locate one or more other wireless access points in response to not receiving a response to the probe frame from any of the wireless access points of the ordered list.

Example 27 includes the subject matter of any of Examples 16-26, and wherein sending a probe frame to the selected first wireless access point includes sending a first probe frame to the selected first wireless access point, and wherein the method further including: (i) selecting, on the local computing device, a second wireless access point and a third wireless access point from the ordered list with which to attempt a connection; (ii) sending, on the local computing device, a second probe frame to the selected second wireless access point and a third probe frame to the selected third wireless access point contemporaneously with sending the first probe frame to the selected first wirelesses access point; and (iii) establishing, on the local computing device, a connection with one of the selected first, second, or third wireless access points in response to the receiving a response to the probe frame from one of the corresponding selected first, second, or third wireless access points.

Example 28 includes the subject matter of any of Examples 16-27, and further including requesting, on the local computing device, new or updated parameters from the remote analysis server.

Example 29 includes the subject matter of any of Examples 16-28, and further including monitoring, on the local computing device, a signal strength between the local computing device and one or more of the wireless access points; determining, on the local computing device, whether the signal strength is equal to or below a reference signal strength threshold; and wherein requesting new or updated parameters from the remote analysis server includes requesting new or updated parameters from the remote analysis server in response to determining that the signal strength is equal to or below the reference signal strength threshold.

Example 30 includes the subject matter of any of Examples 16-29, and further including determining, on the local computing device, whether one or more components of the local computing device are shutting down; and wherein requesting new or updated parameters from the remote analysis server includes requesting new or updated parameters from the remote analysis server in response to determining that one or more components of the local computing device are shutting down.

Example 31 includes a local computing device for reducing a connection time to a wireless access point. The local computing device includes a processor and a memory having stored therein a plurality of instructions that when executed by the processor cause the local computing device to perform the method of any of Examples 16-30.

Example 32 includes one or more machine readable media including a plurality of instructions stored thereon that in response to being executed result in a local computing device performing the method of any of Examples 16-30.

Example 33 includes a remote analysis server for reducing a connection time to a wireless access point. The remote analysis server includes a communication module to receive historical connection information over a network from a local computing device; and a remote analysis module to compute one or more parameters as a function of the received historical connection information, wherein the communication module to transmit the one or more computed parameters to the local computing device for generating an ordered list from one or more wireless access points to connect to at a desired time.

Example 34 includes the subject matter of Example 33, and further including a remote parameter database to store the one or more parameters computed as a function of the received historical connection information.

Example 35 includes the subject matter of any of Examples 33 and 34, and wherein to compute one or more parameters as a function of the received historical connection information includes to generate a prediction program for each parameter using a genetic programming operation.

Example 36 includes the subject matter of any of Examples 33-35, and wherein each computed parameter includes a probability computed as a function of the received historical wireless connection information.

Example 37 includes the subject matter of any of Examples 33-36, and wherein the communication module further to receive a request for new or updated parameters from the local computing device.

Example 38 includes a method for reducing a connection time to a wireless access point. The method includes receiving, on a remote analysis server, historical connection information over a network from a local computing device; computing, on the remote analysis server, one or more parameters as a function of the received historical connection information; and transmitting, on the remote analysis server, the one or more computed parameters to the local computing device for generating an ordered list from one or more wireless access points to connect to at a desired time.

Example 39 includes the subject matter of Example 38, and further including storing, on the remote analysis server, the one or more parameters computed as a function of the received historical connection information in a remote parameter database.

Example 40 includes the subject matter of any of Examples 38 and 39, and wherein computing one or more parameters as a function of the received historical connection information includes generating a prediction program for each parameter using a genetic programming operation.

Example 41 includes the subject matter of any of Examples 38-40, and wherein each computed parameter includes a probability computed as a function of the received historical wireless connection information.

Example 42 includes the subject matter of any of Examples 38-41, and further including receiving a request for new or updated parameters from the local computing device.

Example 43 includes a remote analysis server for reducing a connection time to a wireless access point. The remote analysis server includes a processor and a memory having stored therein a plurality of instructions that when executed by the processor cause the remote analysis server to perform the method of any of Examples 38-42.

Example 44 includes one or more machine readable media including a plurality of instructions stored thereon that in response to being executed result in a remote analysis server performing the method of any of Examples 38-42.

The invention claimed is:

1. A local computing device for reducing a connection time to a wireless access point, the local computing device comprising:
a wireless connection logging hardware module to record in a log stored on the local computing device, wireless connection information for a plurality of wireless connections with one or more wireless access points, the log comprising historical wireless connection information and recent wireless connection information;
a wireless connection management hardware module to (i) retrieve the historical connection information stored on the local computing device, (ii) transmit the retrieved historical connection information over a network to a remote analysis server, and (iii) receive parameters calculated as a function of the historical connection information from the remote analysis server;
a prediction hardware module to generate an ordered list from the one or more wireless access points to connect to at a desired time as a function of the received parameters and the recent wireless connection information, the recent wireless connection information comprising wireless connection information not yet used in calculation of the parameters, wherein the wireless connection management hardware module is further to select a first wireless access point from the ordered list with which to attempt a connection; and
a wireless communication hardware module to cause a probe frame to be sent to the selected first wireless access point.

2. The local computing device of claim 1, wherein each received parameter comprises a prediction program generated using a genetic programming operation, and
wherein to generate an ordered list from the one or more wireless access points to connect to at a desired time comprises to execute the prediction program for each received parameter to generate the ordered list from the one or more wireless access points.

3. The local computing device of claim 1, wherein each received parameter comprises a probability computed as a function of the historical wireless connection information, and
wherein the prediction hardware module is further to (i) assign the probability computed for each received parameter to a different recent wireless connection of the plurality of wireless connections recorded in the log, and (ii) identify a wireless access point corresponding to each recent wireless connection recorded in the log.

4. The local computing device of claim 3, wherein the ordered list comprising the one or more wireless access points arranged in descending order according to the corresponding probability assigned to each different recent wireless connection recorded in the log.

5. The local computing device of claim 3, wherein to identify a wireless access point corresponding to each recent wireless connection recorded in the log comprises to identify a wireless access point corresponding to each recent wireless connection recorded in the log as a function of one or more of a service set identifier, a wireless channel, and a media access control address associated with each wireless access point recorded in the log.

6. The local computing device of claim 1, wherein the wireless connection management hardware module is further to establish a connection with the selected first wireless access point in response to the wireless communication hardware module receiving a response to the probe frame from the selected first wireless access point.

7. The local computing device of claim 1, wherein to send a probe frame to the first wireless access point comprises to send a first probe frame to the first wireless access point, and
wherein the wireless connection management hardware module is further to (i) select a second wireless access point from the ordered list with which to attempt a connection in response to the wireless communication hardware module not receiving a response to the probe frame from the first wireless access point, and (ii) send a second probe frame to the selected second wireless access point in response to not receiving a response to the first probe frame from the first wireless access point.

8. The local computing device of claim 1, wherein the wireless connection management hardware module is further to initiate a scan to locate one or more other wireless access points in response to the wireless communication hardware module not receiving a response to the probe frame from any of the wireless access points of the ordered list.

9. The local computing device of claim 1, wherein to send a probe frame to the selected first wireless access point comprises to send a first probe frame to the selected first wireless access point,
wherein the wireless connection management hardware module is further to select a second wireless access point and a third wireless access point from the ordered list with which to attempt a connection,
wherein the wireless communication hardware module is further to send a second probe frame to the selected second wireless access point and a third probe frame to the selected third wireless access point contemporaneously with sending the first probe frame to the selected first wireless access point, and
wherein the wireless connection management hardware module is further to establish a connection with one of the selected first, second, or third wireless access points in response to the wireless communication module receiving a response to the probe frame from one of the corresponding selected first, second, or third wireless access points.

10. The local computing device of claim 1, wherein the wireless connection management hardware module is further to request new or updated parameters from the remote analysis server.

11. The local computing device of claim 10, wherein the wireless connection management hardware module is further to (i) monitor a signal strength between the wireless communication hardware module and one or more of the wireless access points and (ii) determine whether the signal strength is equal to or below a reference signal strength threshold; and wherein to request new or updated parameters from the remote analysis server comprises to request new or updated parameters from the remote analysis server in response to determining that the signal strength is equal to or below the reference signal strength threshold.

12. The local computing device of claim 10, wherein the wireless connection management hardware module is further to determine whether one or more components of the local computing device are shutting down; and wherein to request new or updated parameters from the remote analysis server comprises to request new or updated parameters from the remote analysis server in response to determining that one or more components of the local computing device are shutting down.

13. A method for reducing a connection time to a wireless access point, the method comprising:

recording, on a local computing device, in a log stored on the local computing device, wireless connection information for a plurality of wireless connections with one or more wireless access points, the log comprising historical wireless connection information and recent wireless connection information;

retrieving, on the local computing device, the historical connection information stored on the local computing device;

transmitting, on the local computing device, the retrieved historical connection information over a network to a remote analysis server;

receiving, on the local computing device, parameters calculated as a function of the historical connection information from the remote analysis server;

generating, on the local computing device, an ordered list from the one or more wireless access points to connect to at a desired time as a function of the received parameters and the recent wireless connection information, the recent wireless connection information comprising wireless connection information not yet used in calculation of the received parameters;

selecting, on the local computing device, a first wireless access point from the ordered list with which to attempt a connection; and sending, on the local computing device, a probe frame to the selected first wireless access point.

14. The method of claim 13, wherein each received parameter comprises a prediction program generated using a genetic programming operation, and wherein generating an ordered list from the one or more wireless access points to connect to at a desired time comprises executing the prediction program from each received parameter to generate the ordered list from the one or more wireless access points.

15. The method of claim 13, wherein each received parameter comprises a probability computed as a function of the historical wireless connection information, and the method further comprising:

assigning, on the local computing device, the probability computed for each received parameter to a different recent wireless connection of the plurality of wireless connections recorded in the log; and identifying, on the local computing device, a wireless access point corresponding to each recent wireless connection recorded in the log, and wherein the ordered list comprising the one or more wireless access points arranged in descending order according to the corresponding probability assigned to each different recent wireless connection recorded in the log.

16. The method of claim 13, further comprising establishing, on the local computing device, a connection with the selected first wireless access point in response to receiving a response to the probe frame from the selected first wireless access point.

17. The method of claim 13, wherein sending a probe frame to the first wireless access point comprises sending a first probe frame to the first wireless access point, and wherein the method further comprising:

selecting, on the local computing device, a second wireless access point from the ordered list with which to attempt a connection in response to not receiving a response to the probe frame from the first wireless access point;

sending, on the local computing device, a second probe frame to the selected second wireless access point in response to not receiving a response to the first probe frame from the first wireless access point; and initiating, on the local computing device, a scan to locate one or more other wireless access points in response to not receiving a response to the probe frame from the first and second wireless access points.

18. The method of claim 13, further comprising:

monitoring, on the local computing device, a signal strength between the local computing device and one or more of the wireless access points;

determining, on the local computing device, whether the signal strength is equal to or below a reference signal strength threshold; and requesting new or updated parameters from the remote analysis server in response to determining that the signal strength is equal to or below the reference signal strength threshold.

19. The method of claim 13, further comprising:

determining, on the local computing device, whether one or more components of the local computing device are shutting down; and requesting new or updated parameters from the remote analysis server in response to determining that one or more components of the local computing device are shutting down.

20. One or more non-transitory machine-readable media comprising a plurality of instructions stored thereon that in response to being executed result in a local computing device:

recording wireless connection information for a plurality of wireless connections with one or more wireless access points in a log stored on the local computing device, the log comprising historical wireless connection information and recent wireless connection information;

retrieving the historical connection information stored on the local computing device;

transmitting the retrieved historical connection information over a network to a remote analysis server;

receiving parameters calculated as a function of the historical connection information from the remote analysis server;

generating an ordered list from the one or more wireless access points to connect to at a desired time as a function of the received parameters and the recent wireless connection information, the recent wireless connection information comprising wireless connection information not yet used in calculation of the received parameters;

selecting a first wireless access point from the ordered list with which to attempt a connection; and sending a probe frame to the selected first wireless access point.

21. The one or more non-transitory machine-readable media of claim 20, wherein each received parameter comprises a prediction program generated using a genetic programming operation, and wherein generating an ordered list from the one or more wireless access points to connect to at a desired time comprises executing the prediction program from each received parameter to generate the ordered list from the one or more wireless access points.

22. The one or more non-transitory machine-readable media of claim 20, wherein each received parameter comprises a probability computed as a function of the historical wireless connection information, and wherein the plurality of instructions further result in the local computing device:

assigning the probability computed for each received parameter to a different recent wireless connection of the plurality of wireless connections recorded in the log; and identifying a wireless access point corresponding to each recent wireless connection recorded in the log, and wherein the ordered list comprising the one or more wireless access points arranged in descending order according to the corresponding probability assigned to each different recent wireless connection recorded in the log.

23. The one or more non-transitory machine-readable media of claim 20, wherein the plurality of instructions further result in the local computing device establishing a connection with the selected first wireless access point in response to receiving a response to the probe frame from the selected first wireless access point.

24. One or more non-transitory machine-readable media comprising a plurality of instructions stored thereon that in response to being executed result in a local computing device:

recording wireless connection information for a plurality of wireless connections with one or more wireless access points in a log stored on the local computing device, the log comprising historical wireless connection information and recent wireless connection information;

retrieving the historical connection information stored on the local computing device;

transmitting the retrieved historical connection information over a network to a remote analysis server;

receiving parameters calculated as a function of the historical connection information from the remote analysis server;

generating an ordered list from the one or more wireless access points to connect to at a desired time as a function of the received parameters and the recent wireless connection information, the recent wireless connection information comprising wireless connection information not yet used in calculation of the received parameters;

selecting a first wireless access point from the ordered list with which to attempt a connection;

sending a probe frame to the selected first wireless access point; and requesting new or updated parameters from the remote analysis server.

25. The one or more non-transitory machine-readable media of claim 24, wherein requesting new or updated parameters comprises requesting new or updated parameters in response to at least one of (i) determining that a signal strength between the local computing device and one or more of the wireless access points is equal to or below a reference signal strength threshold or (ii) determining that one or more components of the local computing device are shutting down.

* * * * *